May 22, 1962  W. HIRSCH ET AL  3,035,583
CONDUCTIVE SUTURES

Filed May 27, 1959  3 Sheets-Sheet 1

INVENTORS.
WINFRED HIRSCH
Mrs. RUTH M. STOLTZ
BY

*Paul M. Klein*

ATTORNEY

INVENTORS.
WINFRED HIRSCH
Mrs. RUTH M. STOLTZ
BY

*Paul M. Klein*

ATTORNEY

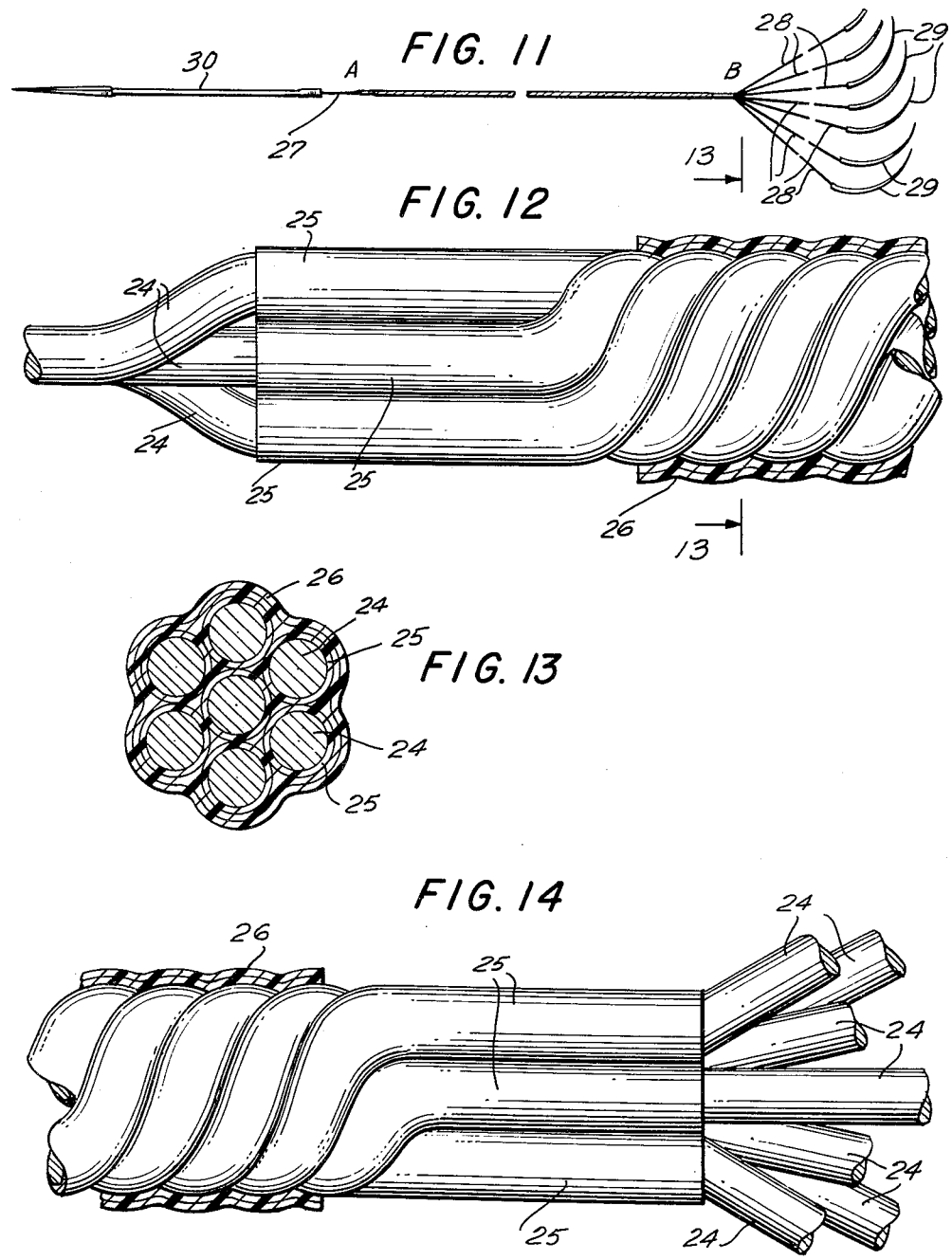

United States Patent Office 3,035,583
Patented May 22, 1962

3,035,583
CONDUCTIVE SUTURES
Winfred Hirsch, 135 Lawrence Place, New Rochelle, N.Y., and Ruth M. Stoltz, 71 Locust Lane, Roslyn Heights, N.Y.
Filed May 27, 1959, Ser. No. 816,091
5 Claims. (Cl. 128—335.5)

This invention relates generally to sutures and their particular construction, and especially deals with electrically conductive sutures especially intended for assisting in cardiac stimulation during surgical heart operations by electrical impulses in the event the beat of the heart ceases during such operations.

Obviously suture structures intended for such delicate operative must be non-resorbable, completely inert and impervious to infiltration of air or moisture and of course must be flexible enough to facilitate closing of a surgical opening and obviously must be resistant to corrosion, oxidation or other deteriorating effects The electric conductivity of the present suture facilitates the attachment at one end of the suture of what is termed a "pacemaker," that is an electrical device which will stimulate the heart into beating, the present suture being so designed as to make direct contact with the heart muscles or tissue so that electric impulses are concentrated right in the heart body itself.

In order to facilitate the piercing of the miocardium, one of the conductive suture ends is preferably equipped with swaged on very fine half-circle piercing needles, which needles are clipped off after use. The conductive parts of the suture provide a direct electrical contact with that part of the heart tissue which is to be stimulated, while the rest of the suture which may touch surrounding tissue is completely insulated from an electrical standpoint so that any electric impulses effected by a pacemaker will only affect a selected portion of the heart.

For the above outlined purposes the present invention comprises a conductive suture which is constructed as follows: A preferably metallic non-resorbable electric conductor in the form of a very thin, non-corrosive or non-oxidizing material is successively covered with a plurality of very thin inert dielectric layers of "Teflon" in such a way that the covering layers form a firm union with the conductor and with one another so that both air, moisture or any other contamination is completely excluded. To be more specific it is proposed to use a very thin stainless steel wire coated with a thin layer of non-conductive material such as "Teflon," and wherein the coating comprises a multiplicity of very thin, successively applied Teflon layers, all of which coating procedure is effected at a substantially high temperature sufficient to produce what may be termed a sintering action, first between the conductor and the first layer of Teflon and subsequently between all successively applied layers of Teflon. This application of either one layer or a multiplicity of layers of Teflon onto the outer surface of the electric conductor and the resulting intimate union between the conductor and the covering material assures not only a perfect bond between the conductor and the covering but also precludes the formation of air spaces which may induce leakage of contaminants into the thoracic cavity of the heart. The coating of Teflon is completely inert and does not absorb moisture nor does it stimulate adverse reactions in a pierced tissue. Similarly, stainless steel, which is the preferred material for the conductor, is also an inert material.

To facilitate the piercing of the heart tissue, after incisions, without causing trauma or other adverse reactions, it is preferred that the present suture structure is inserted by the use of very small semicircular needles which are specially designed for that purpose and which are swaged onto one end of the conductor.

For use of the suture in connection with a pacemaker it is preferred to provide a specially designed cutting needle, known as a Kieth-type needle, at the other end of the conductor. That needle is also swaged onto the conductor and is used for piercing the thoracic wall and to lead the suture to an outer point of the tissue for connecting it with a pacemaker, when stimulation of the heart is required.

Having thus generally described the instant invention, the prime object thereof is the provision of an inert conductive suture composed of an inert, non-corrosive, non-oxidizing electric conductor to which an inert, non-conductive covering is applied in such a way as to unite the conductor with a dielectric covering so as to effect a complete and intimate union between the two materials, both of which being non-resorbent.

A further object of this invention is the provision of a method of producing a conductive suture composed of an inert conductor to which an inert, dielectric coating is applied in such a way as to effect a complete union between the two materials in what may be considered a sintering action.

A further object of this invention is the provision of a conductive suture composed of an inert, thin, very flexible or pliable conductor, composed of a plurality of very thin annealed wires, and covered with one or a multiplicity of coatings of inert dielectric material at a sufficiently high temperature to effect, by a sintering action, a complete union between the conductor and its coating, and, if more than one coating is applied, between the successive coatings.

A still further object of this invention is the provision of a completely inert, non-resorbent conductive suture of the aforesaid structure with which either one or a plurality of very fine piercing needles are associated by swaging them to one end of the suture conductor to facilitate inserting of the suture into tissue, the use of such needle reducing the chance for trauma or other adverse reactions, such as fibrosis.

A still further object of the present invention is the method of producing a conductive suture which consists of applying over the outer surface of an inert non-corrosive conductor at least one or a plurality of layers of an inert dielectric substance, such as Teflon, the application of the Teflon layer or layers being effected at a sufficiently high temperature to assure absolutely the most intimate union between the conductor and the layer or layers of the inert dielectric material.

The foregoing and still further objects and advantages of the present invention will be more fully understood from the ensuing description in conjunction with the accompanying drawings, which latter are intended to serve for explanatory purposes only and are not to be considered as limiting the present invention to the structures illustrated, and wherein:

FIG. 11 is a modified form of a conductive suture in which a plurality of conductor wires is employed;

FIG. 12 is an enlarged detail illustration of a portion of the suture adjacent the Kieth type cutting needle at the left end of FIG. 11;

FIG. 13 is a section taken along lines 13—13 of FIG. 12;

FIG. 14 illustrates a portion of the multiple wire conductor at the right end of FIG. 11 at a point where the individual wires are spread in a fan-like fashion.

Figure 1:
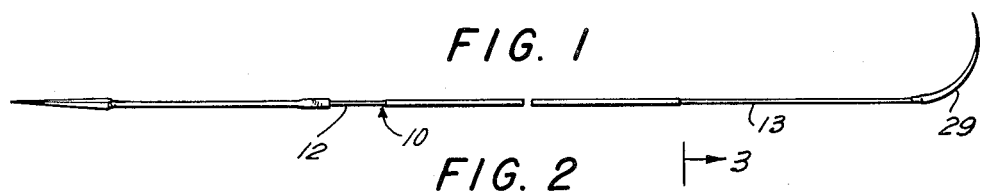
FIG. 1 is a plan view of one form of a conductive suture with a single conductor covered over its major length portion with multiple layers of a non-conductor, the ends of the conductor being bare, according to the present invention.
Figure 2:
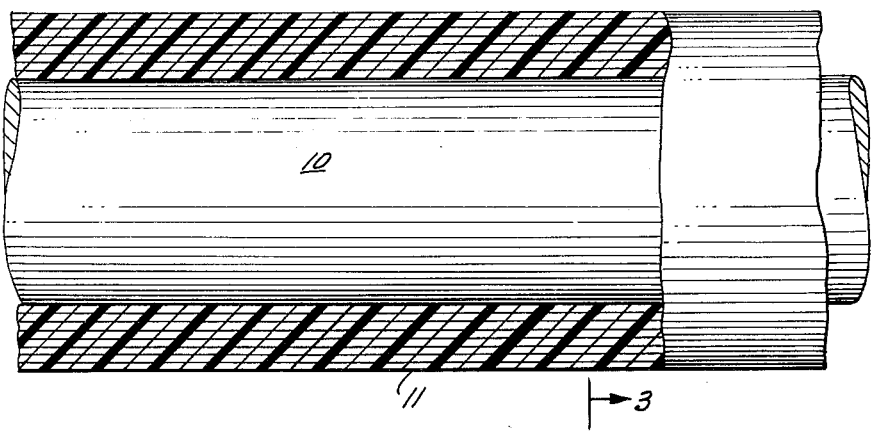
FIG. 2 is an enlarged partial longitudinal cross section through a portion of the suture shown in FIG. 1.
Figure 3:
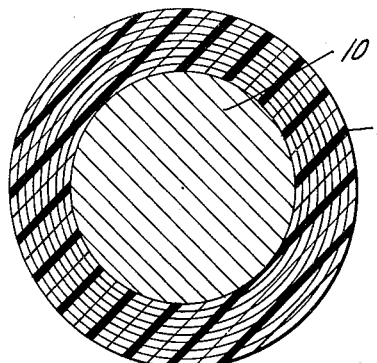
FIG. 3 is a section taken along lines 3—3 of FIG. 2.

In FIGS. 1, 2 and 3 is shown a conductive suture wherein a single conductor 10 is employed in the form of a thin annealed, pliable wire ranging from .014 to .016 thickness or diameter. Applied to the outer surface of the wire is a Teflon coating 11 which extends over the major length portion of the wire but leaves uncoated both ends 12 and 13. It is preferred that the end of the suture which is to pass into the tissue, be equipped with a very fine semi-circular piercing needle 29 which is preferably united by swaging with conductor 10. The employment of such a very fine and small needle is intended to minimize trauma or any other adverse tissue reaction such as fibrosis. The same type of needle and the same way of attaching same to the conductor wires is used in connection with the suture structure seen in FIG. 11, as will be presently explained.

While in FIG. 2 a very much enlarged cross section is shown of a portion of the suture structure seen in FIG. 1, the actual suture is very thin, ranging from .018 to .022 inch in diameter. Here single conductor 10 has a covering 11 consisting of eight very thin layers of Teflon, wherein the thickness of the combined Teflon layers ranges from .002 to .003. In other words, the overall diameter of the finished suture may vary in production, but should not exceed .024. FIG. 3 illustrates how the individual thin layers of Teflon are uniformly applied to conductor 10.

Figure 5:
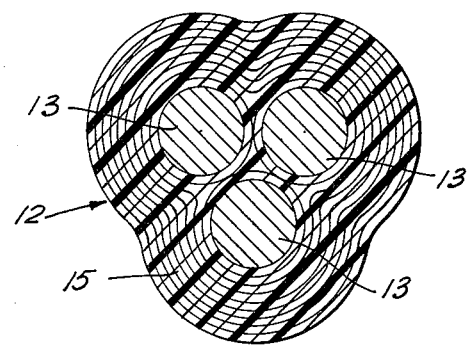
FIG. 5 is a section taken approximately along line 5—5 of FIG. 4.
Figure 4:
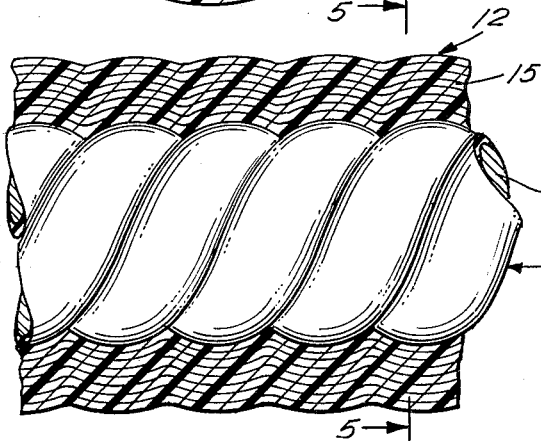
FIG. 4 illustrates a longitudinal cross section through a portion of a modified form of a suture with a twisted multiple wire non-corrosive conductor.

In FIGS. 4 and 5 is shown a conductive suture in which is employed a multiple wire conductor consisting of three individually pre-coated stainless steel wires twisted together as at 14. The thickness of this twist of wires preferably corresponds to the thickness of single conductor 10 shown in FIG. 1 and of course the Teflon coating 15 again preferably corresponds in thickness to coating 11 shown in FIG. 2.

Figure 6:
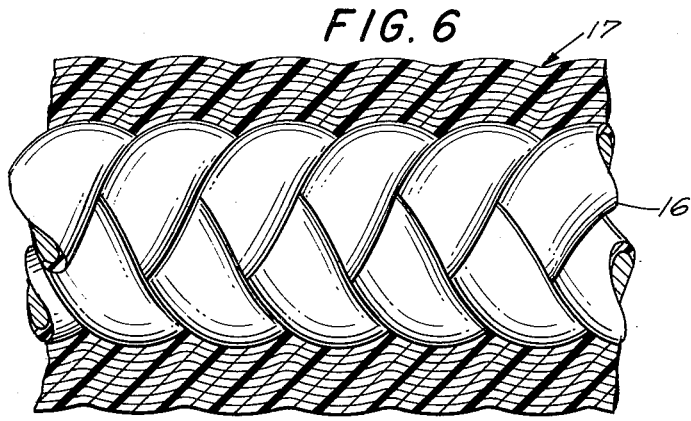
FIG. 6 is a longitudinal cross section through a portion of another modified form of the present suture with a braided multiple wire conductor.

In FIG. 6 the conductor consists of a braided wire construction 16 encased in a Teflon multiple covering 17.

Another suture construction is shown in FIGS. 7 to 10, wherein the conductor 18 comprises a single wire coated as at 19 with several layers of Teflon. The left end 20 of conductor 18 is left bare and is preferably equipped with a stainless steel Kieth type cutting edge needle 21 which is permanently attached by swaging to conductor 18. The right-hand end 22 of conductor 18 is provided with a single Teflon coating 23 as seen clearly in FIG. 8, whereas the major length of the conductor wire is covered by the aforesaid multiple layer coating 19.

Figure 9:
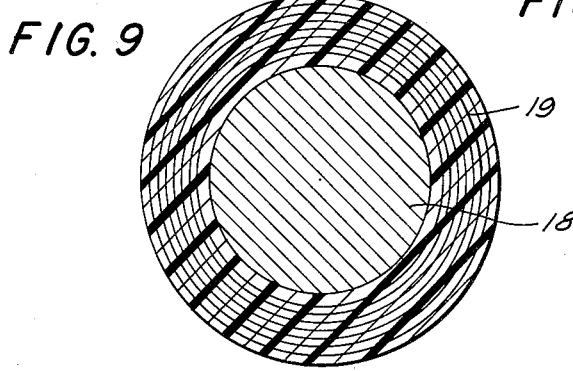
FIG. 9 is a section taken approximately along lines 9—9 of FIG. 8.
Figure 10:
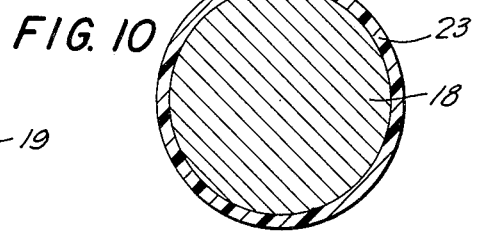
FIG. 10 is a section taken along lines 10—10 of FIG. 8.

The different applications of coating at different portions of the conductor are best seen in FIGS. 9 and 10. In FIG. 9 wire 18 is shown to be covered by a series of Teflon layers 19, whereas FIG. 10 shows the wire 18 coated with a single layer of Teflon 23.

In FIGS. 11 to 14 is illustrated a modified form of a suture structure with a conductor composed of a plurality of wires, the purpose of which will become presently evident.

As will be seen in FIGS. 12 to 14, the several conductor wires 24 are coated individually as at 25. This individual coating extends from area "A" to area "B," FIG. 11. The individual wires are bunched together and can be held in either parallel relation to one another or can be twisted together, as shown in FIGS. 12 and 14, or can be braided in the manner illustrated in FIG. 6. After the individually coated wires are bunched together, a multiple layer coating of Teflon, indicated at 26, is applied. The uncoated left-hand end 27 of the wires is then twisted together, whereas the uncoated ends 28 at the right-hand end of the suture are left bare to facilitate forming from them a fan-like structure. To each of the individual bare wires 28 there is attached by swaging a very fine curved, taper point piercing needle 29. The provision of the fan-like arrangement of the right-hand end of the conductor is intended to uniformly distribute electric impulses from a pacemaker over a substantially large area of the heart tissue, whereby a more effective stimulation of the heart is effected. To the bare left end 27 of the conductor is secured, preferably by swaging, a Kieth type cutting needle 30.

Figure 8:
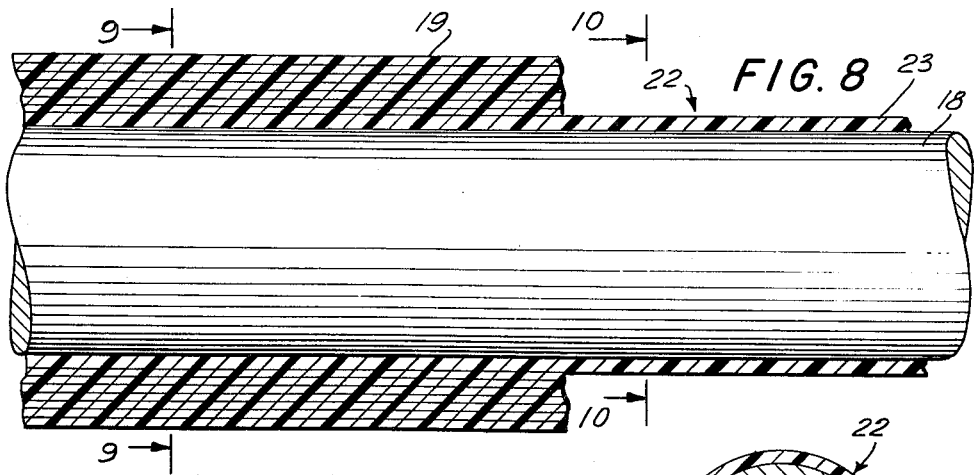
FIG. 8 is an enlarged longitudinal cross section through a part of the right end portion of FIG. 7.

The reason for employing a plurality of thin wires, as shown in FIGS. 4, 5 and 6 and FIGS. 11 to 14, inclusive, in preference to a single wire, as seen in FIGS. 2, 3 and 8, is the superior flexibility and pliability of such multiple wire structure over a single wire conductor, since pliability and flexibility of a suture is highly desirable.

The Method

In order to produce a suture structure as described in connection with the several figures of the drawings, certain exact procedural steps are essential to effect a suture structure suitable for the purposes and use required. To produce a suture of the type shown in FIGS. 1 to 3, a single stainless steel wire is annealed to the proper softness, and onto the outer surface of the wire is applied a first layer of Teflon in suspension, while subjecting both the wire and the Teflon coating to a sufficiently high temperature to effect a sintering action between the two materials. It has been found that the proper temperature for this purpose must reach approximately 700 degrees Fahrenheit. When the first coat of Teflon sets, by leaving of course bare the ends of the wire, a second, third, fourth, fifth and sixth coating is applied at the necessary temperature over the first coating. At the aforesaid temperature a sintering action is effected between the several coatings of Teflon in suspension successively applied to the first coating. There of course may be applied as many as eight coats depending upon the specific requirements for which the suture is intended. It was found that a stainless steel, corrosion resistant wire of from .012 to .016 of an inch in diameter, properly annealed, can be used in the formation of the suture structure, such as shown in FIGS. 1 to 3 inclusive.

Instead of a single stainless steel wire of the aforesaid diameter, a multiplicity of wires may be employed, such as seen in FIGS. 5 and 6. In that case the wires used are much thinner in diameter and each of the wires is individually coated as shown in FIGS. 4 and 5, whereupon they are twisted. In their twisted form they receive a successively applied multiple coating of Teflon in suspension. The wires can be either twisted or braided, as shown respectively in FIGS. 4 and 6. Obviously the same sintering action is effected at the required temperature.

The method employed in producing a single conductive suture structure shown in FIGS. 7 to 10, one end 22 of the wire is provided with a single Teflon coating. Of course that coating continues over the rest of the length of the wire except for the left-hand end which is left bare. Also in this case the first and subsequent Teflon layers in suspension are applied at a high temperature to promote the desired sintering action.

In the method employed for producing a suture such as shown in FIGS. 11 to 14, the following steps are taken: Several very thin wires are individually coated with one layer of Teflon in suspension at a temperature sufficient to promote a sintering action between the wire and the coating. Then the wires are held in either parallel relation to one another or they are twisted or braided, the ends of the wires remaining bare. Now the entire twisted or braided portion of the primarily coated wires are re-coated with several layers of Teflon in suspension, all of which procedure taking place at a sufficiently high temperature to promote complete fusion between the wires and the Teflon layers by a sintering action. The bare ends of the single wires at the right end of FIG. 11 are then equipped with very fine piercing needles by swaging them onto the wire ends. The left-hand bare ends of the wires are twisted together and, if required, are equipped with what is called a Kieth type cutting needle.

Figure 7:
FIG. 7 is another modified form of a suture with a single conductor having a multiple layer non-conductive covering over its major length portion, one end of the conductor having a single layer covering, as different from that shown in FIG. 1.

The same type of cutting needle is used in connection with single sutures when required, as seen in FIGS. 1 and 7. Obviously when the piercing needles 29 have passed through the heart tissue they are simply cut off, and the same applies to the Kieth type cutting needle if the latter is no longer required.

*Application and Use of the Device*

The present suture structure is eminently suitable for cardiac operations. The small, curved piercing needle 29 attached to one bare end of the electric conductor facilitates piercing the heart tissue easily, and since the suture structure is completely inert, it will not permit either air, moisture or any other contamination to enter the heart muscles. Moreover the small needle eliminates or substantially minimizes the possibility of creating trauma or any other adverse tissue reaction, such as fibrosis. The same applies to the body of the suture structure itself which is very small in diameter and therefore produces a minimum of distention of the tissue. Obviously the high flexibility and inertness inherent to the pliable and flexible structure of the suture facilitates ready manipulation, and due to its exceptional strength, provides a high degree of security for the surgeon and maximum safety for the patient, all of which features limit to a minimum exterior infection.

In its use as an added instrumentality for stimulating the heart, the very small diameter conductor or conductors facilitate a minute contact with the heart tissue irrespective of whether a single suture with a single bare end enters the heart, such as shown in FIG. 1, or a suture with multiple conductor ends such as shown in FIG. 11, is employed.

Referring to FIG. 7, that type of suture is used where only a very small amount of current is intended to be employed as a stimulant. There the single coverage of Teflon at the inserted end 22 of the suture is a highly resistive coating capable of restricting high potency current passing into the heart tissue since the single layer of Teflon will permit limited passage of electricity through it.

It is to be pointed out that in the application of Teflon to the suture, a suspension of Teflon is used without a polymer of Teflon. By using Teflon in suspension without polymer, any adverse tissue reaction which may be caused by residual polymers is completely eliminated.

While the present suture structure was primarily designed for open heart surgery and stimulation of the heart by means of a pacemaker, it is also very well suited for other types of operations.

The stainless steel, advantageously used as conductor within the Teflon coating, is preferably of the composition known as 18—8, which is corrosion resistant, and is annealed to provide the desired flexibility both in the form of a single wire as shown in FIG. 1, or in the form of twisted or braided multiple wires as shown, respectively, in FIGS. 4, 12 and 6.

As stated in connection with the description of the figures, the latter serve for explanatory purposes only and by no means are intended to limit the present invention to the structures shown and described, since variations of the structure may be dictated due to various surgical uses. It is therefore intended that the present invention include such required variations, all within the scope of the annexed claims.

What is claimed as new is:

1. In a suture structure, a non-resorbable, non-oxidizing flexible conductor, a non-conductive cover for same intimately and immovably united therewith over a substantial portion of its length, but leaving bare both of its termini and a needle attached to one of the bare termini.

2. The suture structure of claim 1 wherein a cutting needle is attached to the other bare terminus.

3. In a suture structure, a non-resorbable, non-oxidizing flexible conductor, a non-conductive, multiple-layer coating covering the same and being intimately and immovably united with the conductor over substantially its entire length, but leaving bare one of its ends, a cutting needle attached to said bare end, and a single highly resistive coating layer covering and intimately adhering to the other end of the conductor.

4. In a suture structure, a non-oxidizing, flexible conductor composed of a plurality of individual, closely united, very thin, annealed stainless steel wires, each wire being individually covered and intimately and immovably united with a dielectric coating over substantially its entire length, leaving bare the wire termini, one of the bare ends of the conductor forming an intimate union of the bare ends of the thin wires, while at the other conductor end the bare ends of the thin wires are spread in a fan-like formation, and piercing needles attached to each of the bare ends of the fan-like formation.

5. In a non-resorbable, highly flexible and pliable non-oxidizing conductive suture structure which is impervious to infiltration of air, fluid and contamination, a plurality of grouped-together individual very fine annealed stainless steel wire strands, a thin dielectric layer covering individually each of the wire strands except their ends, a plurality of layers of dielectric coating intimately and immovably encasing the grouped-together wire strands, but leaving bare their termini, and needles attached to each of said strands at one of the ends of the structure.

References Cited in the file of this patent

UNITED STATES PATENTS

| 1,558,037 | Morton | Oct. 20, 1925 |
| 2,591,063 | Goldberg | Apr. 1, 1952 |
| 2,770,565 | Pergunas et al. | Nov. 13, 1956 |
| 2,869,550 | Kurtz | Jan. 20, 1959 |
| 2,871,151 | Lipton | Jan. 27, 1959 |
| 2,893,900 | Machlin | July 7, 1959 |

FOREIGN PATENTS

| 464,774 | Great Britain | Apr. 23, 1937 |